(12) United States Patent
Amstrup

(10) Patent No.: US 6,168,511 B1
(45) Date of Patent: Jan. 2, 2001

(54) METHOD AND APPARATUS FOR RINSING PIECES OF MEAT

(75) Inventor: Fritz Amstrup, Skovkrattet 3, DK-8850 Bjerringbro (DK)

(73) Assignee: Fritz Amstrup, Bjerringbro (DK)

( * ) Notice: Under 35 U.S.C. 154(b), the term of this patent shall be extended for 0 days.

(21) Appl. No.: 09/269,075

(22) PCT Filed: Sep. 22, 1997

(86) PCT No.: PCT/DK97/00399

§ 371 Date: Mar. 19, 1999

§ 102(e) Date: Mar. 19, 1999

(87) PCT Pub. No.: WO98/12928

PCT Pub. Date: Apr. 2, 1998

(51) Int. Cl.⁷ ............................................. A22B 5/00
(52) U.S. Cl. .................................... 452/173; 452/123
(58) Field of Search .......................... 452/173, 10, 123

(56) References Cited

U.S. PATENT DOCUMENTS 4,710,999 * 12/1987 Brunner et al. ................ 452/173

FOREIGN PATENT DOCUMENTS

| 587335 | * 11/1959 | (CA) | ................ 452/173 |
| 469506 | * 12/1928 | (DE) | ................ 452/173 |
| 568186 | * 1/1933 | (DE) | ................ 452/173 |
| 815014 | 9/1951 | (DE) . | |
| 37849 | 8/1927 | (DK) . | |
| 157350 | 6/1919 | (GB) . | |
| 2129327 | 5/1984 | (GB) . | |
| 59266 | 4/1938 | (NO) . | |

* cited by examiner

Primary Examiner—Willis Little
(74) Attorney, Agent, or Firm—Antonelli, Terry, Stout & Kraus, LLP

(57) ABSTRACT

A method for rinsing pieces of meat, which preferably in connection with the slaughtering process itself have been sorted out, because they have been poured over with blood, where a portion of pieces of meat are centrifuged during simultaneously adding of cold rinsing water for a period of 2–4 minutes, and where said portion thereafter is further treated by centrifuging without adding rinsing water for a period in the order of 2–3 minutes, whereafter the rinsed and drained meat, which now may be used for consumer purposes, preferably automatically is emptied from the centrifuge, and an apparatus in the form of a centrifuge of the slinging/scrabing type with a stationary cylindric collecting container (8) for the meat to be rinsed, said apparatus comprising a motor-driven, circular bottom plate (22) with bringing along ribs (24) surrounded by a detachable ring-shaped hole plate (18), said collecting container (8) is at the inner side provided with upright inclined ribs (16) and a side opening with a screened opening flap for emptying of rinsed pieces of meat, which are filled in through an upper central opening in the top plate (10) of the collecting container (8), which is hinge-connected with a carrying chassis (2), so that the collecting container (8) may be swung up to a position, in which it is possible to have free access to wash down the inner side of the collecting container and the bottom plate (22), as the plate ring (18) is detachable.

4 Claims, 2 Drawing Sheets

METHOD AND APPARATUS FOR RINSING PIECES OF MEAT

TECHNICAL FIELD

The present invention relates to a method and apparatus for rinsing pieces of meat in a centrifuge of the slinging/scrabing type.

BACKGROUND

Hitherto it has not been possible to exploit all meat in connection with slaughtering of domestic animals, in particular pigs and cattles, because minor meat parts of the individual animal to be slaughtered, for instance socalled marginal meat from the neck region, which meat during the slaughtering process have been in connection with the outflowing blood—for veterinary reasons and because of religious traditions—or because of the costs involved with manual clean cutting have been scrapped or alternatively been used in the production of cat and dog food. In practice it primarily concerns neck meat, namely socalled trimming meat or stab wound meat, which cannot be used as consumer meat, because it in connection with the slaughtering process itself is overflowed with blood etc.

SUMMARY

The invention has for its purpose to provide a method for rinsing pieces of meat and which by means of simple provisions makes it possible to use said marginal meat, which hitherto as a whole has been considered as useless—for consumer purposes.

The method according to the invention is distinctive in that a portion of said pieces of meat for instance in the order of 10–20 kg are centrifuged during simultaneously adding of cold rinsing water for a period of 2–4 minutes, and that said portion thereafter is further treated by centrifuging without adding water for a period in the order of 2–3 minutes, whereafter the rinsed meat, which now may be used for consumer purposes, preferably automatically is emptied from the centrifuge. By simple provisions a combined scraber and massage treatment of the pieces of meat is hereby obtained, which pieces of meat subsequently are rinsed, so that it becomes possible to obtain veterinary approval of the rinsed meat for consumer purposes, for instance for the use by manufacturing of sausages, tinned meat and ready dinners. Furthermore a reduction of the fat content is obtained, because external fat on the pieces of meat during the treatment partly is removed.

However, it is a condition for such a veterinary approval of the rinsing method according to the invention, that said centrifuge may be cleaned effectively before and after treatment of a portion of meat, for instance in idle operation and rinsing through with hot water (about 82° C.) for a short period up to about 2 minutes, so that the centrifuge is cleaned and cleansed from fat and bacteria, before a new portion of meat to be rinsed is filled in the centrifuge.

The invention furthermore relates to an apparatus for carrying out the method according to the invention, the apparatus comprising a centrifuge of the slinging/scrabing type.

This type of apparatus, which by way of example is described in DE-C-815 014, is originally developed for cleansing of cut up stomachs and third stomachs, but has also been used for cleansing and desliming of in advance turned intestines and cf. for instance Danish Patent Application No. 5299/80 also for degreasing of not turned intestines. For such cleansing purposes a current washing out of the waste is used, which is obtained by use of a surrounding nozzle tube placed along the periphery under said top plate and by use of a peripheral row of drain holes between the edge of the bottom rotor plate and the lower, fixed part of the collecting container, so that the draining of water and waste is carried out via a drain under said drain holes. In spite of the presence of the drain holes the rotating bottom plate will still be able to sling the cleaned goods out against the side of the container, where the material by its sling inertia both will be slung against the innerside of the collecting container and carried around along this innerside, until the material is braked and falls back towards the bottom plate, which then again influences the material to be slinged.

In connection with this invention it is pointed out, that a such slinging and scrabing treatment may be advantageous also in relation to pieces of bloody consumer meat, but hereby it becomes a perceptible problem, that the known apparatuses are extremely difficult to clean so effectively, that the veterinary demands can be fulfilled. For instance it is almost impossible to carry out an effective cleansing in under the top plate of the container via the filling and emptying opening. It is furthermore problematic, that it is difficult to clean the very narrow slit ocurring between the fixed ring-shaped bottom part with said drain holes and the rotating bottom plate. This aimed narrow slit will be a fine growing place for bacteria, also in spite of the fact that it to some extent will be flowed through by the rinsing water, of which the main part however is drained through the holes in the fixed bottom part.

The apparatus according to the invention is distinctive in that said collecting container is connected with an underlying carrying chassis in a swing-open manner, so that the collecting container may be swung up to a position, in which it is possible for instance with a high-pressure cleaner to have free access to wash down the inner side of the top plate through the lower opening of the collecting container exposed by the swing-open thereof. In a simple manner it is hereby possible to make an effective rinsing, for instance with a high-pressure cleaner, of the innerside of the apparatus—in addition to said machine cleaning between treatment of the individual portions of meat.

If said ring-shaped bottom part with drain holes follow this swung up, there will also be access to said narrow slit, so that the opposite side edges of the bottom part are freely available for effective cleaning.

By the apparatus according to the invention it is preferred, that said bottom part consists of a separate plate ring, which is detachably mounted on the carrying arms of the apparatus, so that this plate ring easily may be replaced with a second plate ring with drain holes of a different size, for instance with larger holes for use by rinsing of beef.

By said swinging open up of the collecting container the inner edge of the plate ring will not be exposed; but such an exposure may either take place during demounting of the bottom rotor plate from the driving shaft of the motor or—preferably—by the fact that the plate ring is mounted in a detachable manner on the bearing chassis. This can be done with an easy releasable bolt assembly; but preferably according to the invention more easily with a bayonet assembly, so that the plate ring may be de- and remounted by a simple turning movement. Hereby the plate ring—as a separate part—may be easily detached for effective cleaning of both edges and drain holes.

The invention is explained in more detail in the following with reference to the drawings.

DETAILED DESCRIPTION

Figure 1:
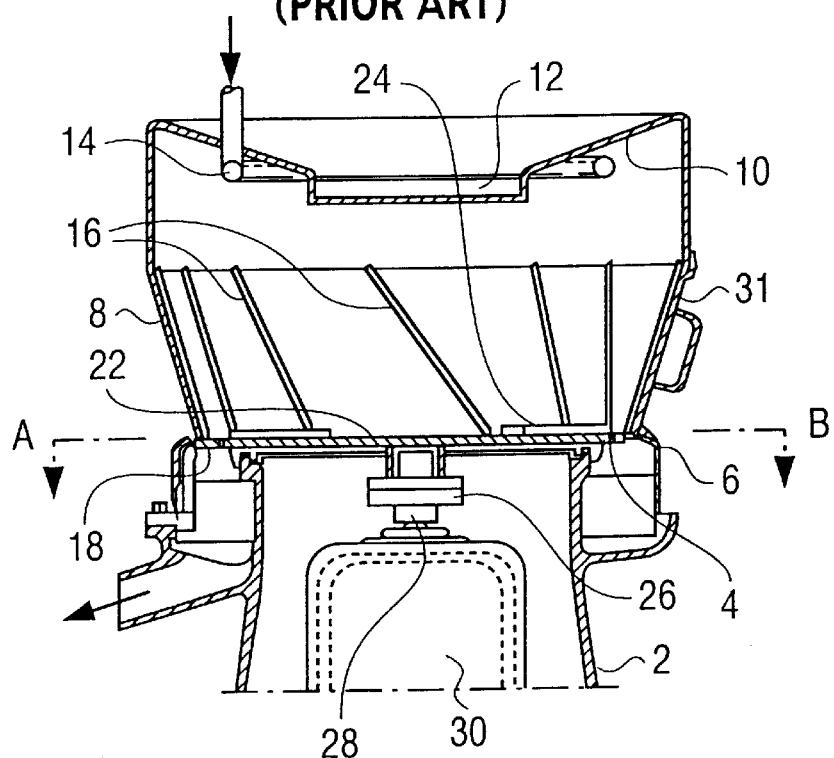
FIG. 1 shows a side view—partly in sections—of a known centrifuge.
Figure 2:
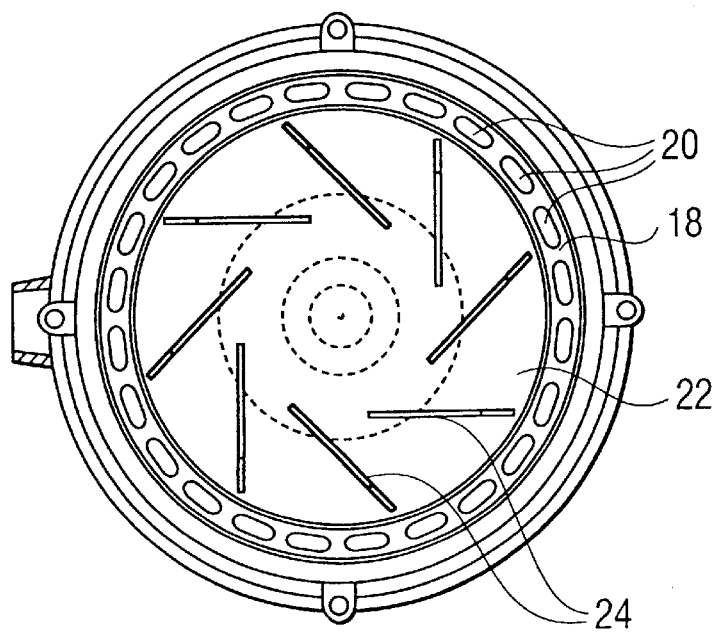
FIG. 2 shows a top view—partly in sections—cf. the perspective line A–B of the known centrifuge shown in FIG. 1.

In FIGS. 1 and 2 a known basic type of the apparatus in question is shown. This known apparatus comprises a lower chassis 2, which at upper, projecting wing parts 4 supports a plate rim 6, which at the top is assembled with the lower edge of a container 8, which above is ended with an inwardly projecting top plate 10 with a central opening 12, around which a ring-shaped nozzle tube 14 is placed. The inner side of the container 8 is provided with slightly inclined ribs 16. At the passage between the plate rim 6 and the container 8 an inwardly projecting rigid plate ring 18 provided with a round-going row of holes 20 is positioned. Inside the plate ring 18 and on level with this a circular bottom plate 22 is placed having upstanding bringing along ribs 24 and a centrally downwards projecting coupling flange 26, respectively, by means of which the latter is secured to an upstanding axle journal 28 of a driving motor 30 inside the chassis 2.

In the situation of operation the apparatus works in such a manner that products, which are filled down through the upper central opening 12, hit the rotating bottom plate 22, where the bringing along ribs 24 sling the products against and along the inner side of the collecting container 8, by which the products are exposed for a scraber or massage effect according to how the ribs 16 are provided. When the treatment is finished the products may be emptied out through a side opening within a side flap 31, just by the swinging up of this, as the rotating bottom disc 22 will take care of the slinging out of the products.

This known apparatus forms on the whole a coherent unit, which almost is impossible to clean effectively. This has been acceptable as long as the apparatus has been used for its original purpose, as it was developped for, namely for cleansing of abdomens and intestines; but after statement in connection with the invention that this in principle known type of apparatus also is very useable for treatment of pieces of meat, it has also become necessary to modify the apparatus towards a more cleaning friendly construction. Particularly two places seem to be critical, namely the under side of the upper cover plate 10 and in particular the narrow split between the periphery of the rotating bottom disc 22 and the surrounding plate ring 18, because these part areas of the apparatus are difficult to clean effectively.

Figure 3:
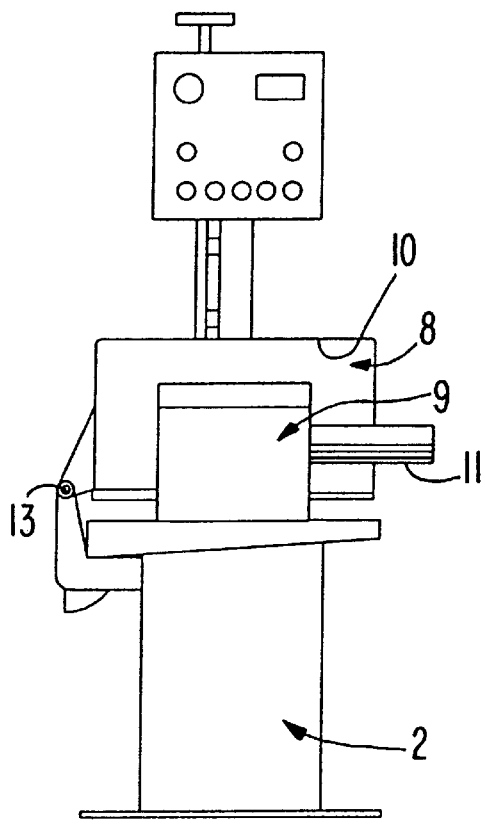
FIG. 3 shows a side view of a preferred embodiment for an apparatus according to the invention.
Figure 4:
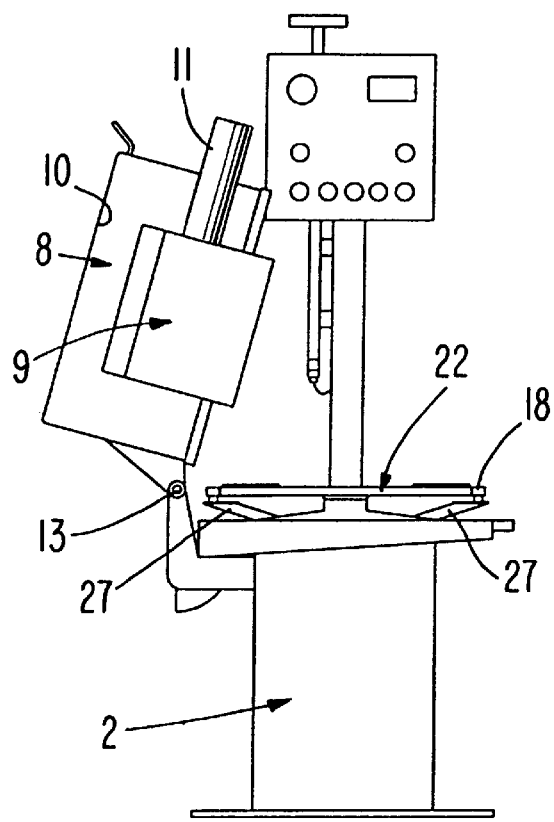
FIG. 4 shows also a side view of the apparatus shown in FIG. 3 according to the invention, where the collecting container is swung up in relation to the bottom part of the apparatus.

By the apparatus according to the invention, which in a preferred embodiment is shown in FIGS. 3 and 4, the whole upper part in form of the collecting container 8 with belonging opening mechanism 9 for said side door operated by a pneumatic cylinder 11, via side hinges 13 is hinged to the chassis 2, so that the whole upper part may be swung out to the position shown in FIG. 4, where there is free access to wash down towards the underside of the shirt plate 10 and the inner side of the collecting container 8 inclusive of the screened emptying opening.

Figure 5:
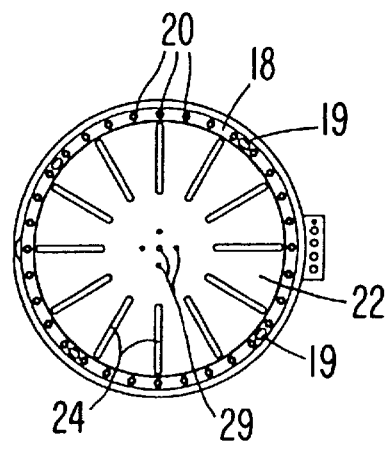
FIG. 5 shows a top view—corresponding to FIG. 2, that is where the lower part of a apparatus according to the invention is exposed.
Figure 6:
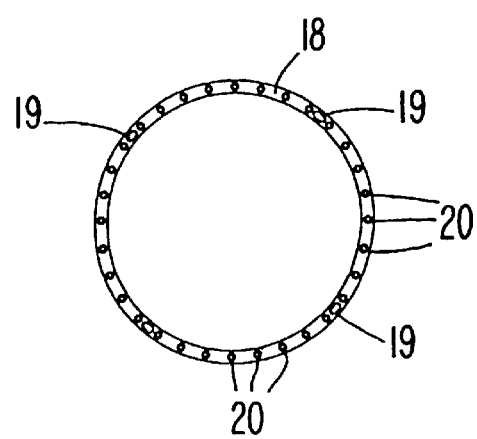
FIG. 6 shows a top view of a loose plate ring to the apparatus according to the invention.

The plate ring 18 is by the apparatus according to the invention—as a separate part—detachably mounted on radial arms 27 on the chassis 2, and the bottom disc 22 may easily be demounted by removal of one or several center screws 29, whereafter the bottom disc 22 may be lifted free from one or several driving pins of a flange on the motor axle. Hereby the bottom disc 22 and its outer edge may be cleaned effectively; and also the plate ring 18 with possible shell part become accessible for effective cleaning. Preferably the plate ring 18—as shown in FIGS. 5 and 6—is mounted in a detachable manner, for instance by use of keyholes 19 and belonging upright dowels on the radial arms 27, so that more bayonet locks for the plate ring 18 are formed, which plate ring 18 then in a quick and simple manner may be de- and remounted in one turning movement. The plate ring 18 with belonging holes 20 of varying sizes suited the actual production may effectively be cleaned—for instance external.

Said possible shell part may without problems be permanently mounted in relation to the plate ring 18 on the chassis 2, as the swinging up of the collecting container and the easy demounting of the plate ring 18 allows easy access to effective cleaning of the inside of a such possible permanent shell part.

It shall be emphasized, that the method respectively the apparatus according to the invention is primarily intended for rinsing of pieces of meat, namely trimmed meat from cattle, neck meat from pigs and socalled picking meat (trimming by cutting up); but it has furthermore become apparant, that it also is possible to use a modified apparatus according to the invention for deskinning of poultry feet, as during treatment in the combined slinging and scrabing centrifuge water is added with a temperature about 72° in order to soften the skin and to kill possible salmonella bacteria at the same time. The modification of the centrifuge primarily involves that bringing along and scrabing ribs are made from rubber with a suitable hardness.

Said trimming meat from cattle primarily comes from socalled trimming of necks. Meat with stab wounds may come from both pigs and cattles. Neck meat from pigs consists often of glands, fat and meat (about ⅓ of each kind).

By means of the method respectively to the apparatus according to the invention it is expected, that the following quantities of meat can be processed for consumer purposes. Concerning pigs it is expected to recover up till about 700 g and for cattles up til about 2500 g per animal.

In practice it may be advantageous to have a conveyer belt which extends from the position of trimming to an intermediate container (buffer) placed over the filling opening 12 of the apparatus. When the buffer contains for instance 10–20 kg the filling may take place automatically via a bottom opening in the buffer or by dumping thereof.

Preferably cold water is added, about 20 l/min, during the primary rinsing of pieces of meat for about 2.5 minutes, before the pieces of meat are drained during continuous centrifuging without adding water for further 2,5 min, which preferably happens automatically. During the rinsing a considerable cooling of the pieces of meat from about 35° to about 15° (water temperature about 9°) furthermore is obtained, that is that as a consequence of both treatment and rinsing and quick cooling a very considerable reduction of the germ figure is obtained.

Preferably—as mentioned—cold water is used for the rinsing of the pieces of meat; but exceptionally it may be talked of using rinsing water of about 40° C., if it concerns pieces of meat with much fat.

Finally it shall be mentioned, that the apparatus according to the invention also advantageously may find more general use within the slaughterhouse trade, for instance for cleaning, desliming and not least degreasing of abdomens from cattle and pigs and intestines. In particular the fact that it is possible to clean the apparatus effectively, fulfills all considerable veterinary demands for cleaning of apparatuses.

What is claimed is:

1. A method for rinsing pieces of bloody meat to clean the meat for consumer purposes, which meat in connection with the slaughtering process itself has been poured over with blood, and therefore cannot be approved for consumer purposes, said method comprising rinsing said pieces of bloody meat in a centrifuge of the slinging/scrabing type, wherein a portion of said pieces of meat in the order of 10–20 kg are centrifuged during simultaneously adding of cold rinsing water for a period of 2–4 minutes, and wherein said portion thereafter is further treated by centrifuging without adding water for a period in the order of 2–3 minutes, whereafter the rinsed meat automatically is emptied from the centrifuged.

2. A method according to claim 1, further comprising rinsing said centrifuge in operation with hot water for a short period up till 2 minutes to clean fat and bacteria from said centrifuge, before the centrifuge is filled up with a new portion of meat for rinsing.

3. An apparatus for rinsing pieces of bloody meat to clean the meat, said apparatus comprising a centrifuge of the slinging/scrabing type having a stationary mainly cylindrical collecting container for containing pieces of meat to be cleaned, which container at its bottom having a motor-driven, circular plate with bringing along ribs, said container at least at a lower part of the inner side is provided with upright inclined ribs and a side opening covered by an opening flap for emptying the treated pieces of meat, which container has a central filling opening in a top plate of the container, and wherein said collecting container is connected with an underlying carrying chassis in a swing-open manner, so that the collecting container may be swung up relative to said motor-driven, circular plate and said chassis to a position, in which it is possible for instance with a high-pressure cleaner to have free access to wash down the inner side of the top plate through a lower opening of the collecting container exposed by the swing-open thereof.

4. An apparatus according to claim 1, wherein said bottom further comprises a separate plate ring, which is detachably mounted on carrying arms of the apparatus.

* * * * *